H. B. KEIPER.
DEMOUNTABLE RIM.
APPLICATION FILED FEB. 21, 1911.

1,097,550.

Patented May 19, 1914.
2 SHEETS—SHEET 1.

WITNESSES

INVENTOR
Henry B. Keiper
By Julius C. Howell
His Attorney

H. B. KEIPER.
DEMOUNTABLE RIM.
APPLICATION FILED FEB. 21, 1911.
1,097,550.
Patented May 19, 1914.
2 SHEETS—SHEET 2.
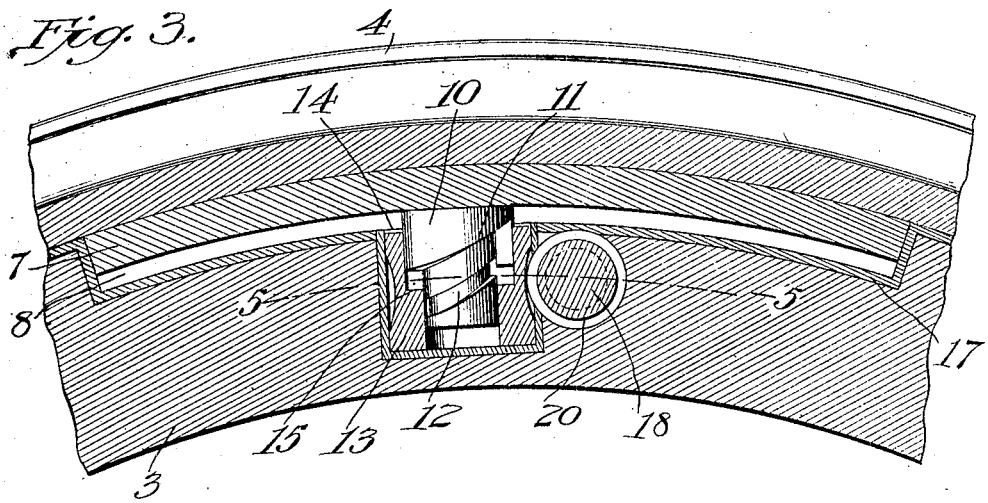
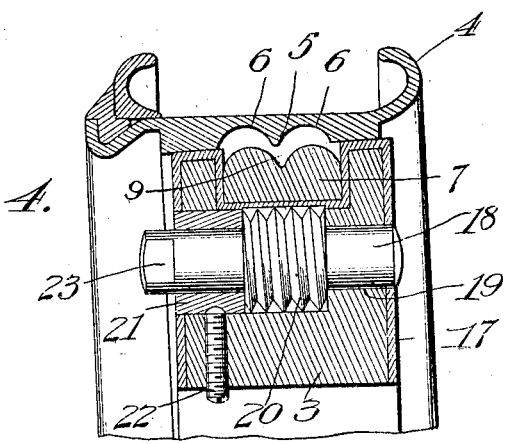
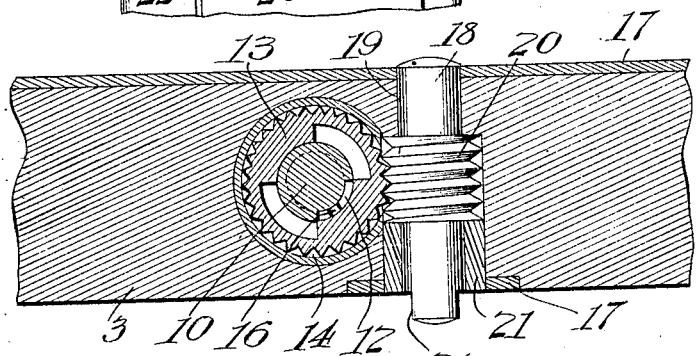

UNITED STATES PATENT OFFICE.

HENRY B. KEIPER, OF LANCASTER, PENNSYLVANIA.

DEMOUNTABLE RIM.

1,097,550.  Specification of Letters Patent.  Patented May 19, 1914.

Application filed February 21, 1911. Serial No. 610,030.

*To all whom it may concern:*

Be it known that I, HENRY B. KEIPER, a citizen of the United States, residing at Lancaster, in the county of Lancaster and State of Pennsylvania, have invented certain new and useful Improvements in Demountable Rims, of which the following is a specification.

The object of my invention is to provide a demountable rim for wheels equipped with pneumatic and similar tires, whereby the removal of a punctured or otherwise injured tire may be readily accomplished.

A further object of the invention is to provide a demountable rim which, when in use, will be securely held upon the wheel, and which will be secured by means seated within the felly at spaced points around the same, of such a character that there will be no projecting parts liable to injury and the mechanism will consequently be in an operative condition at all times.

A further object of the invention is to provide means for holding the rim in position upon the wheel, of such a nature that the operation of the holding means will serve to draw the rim onto the wheel.

All these stated objects, and other incidental objects which will hereinafter appear, are attained in the use of a device such as is illustrated in the accompanying drawings, and the invention resides in certain novel features which will be hereinafter first fully described, and then more particularly pointed out in the appended claims.

Figure 1:
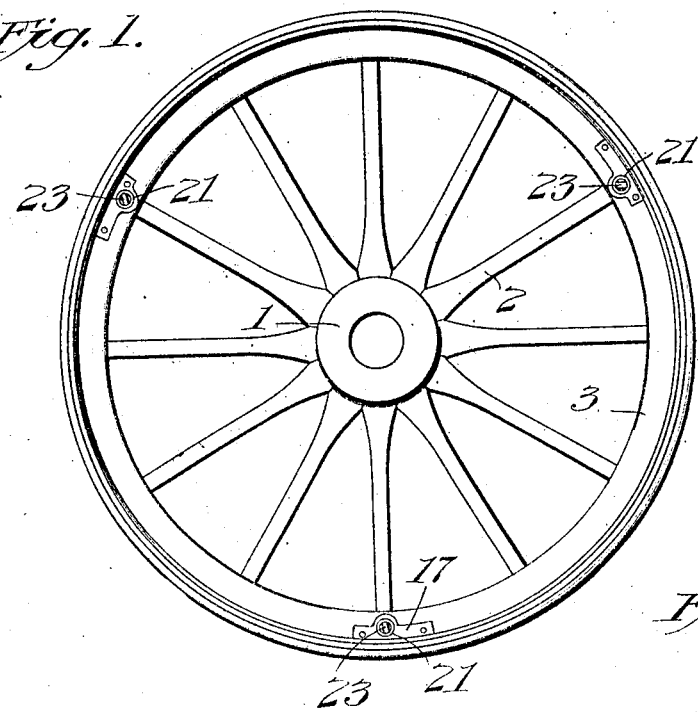
Figure 6:
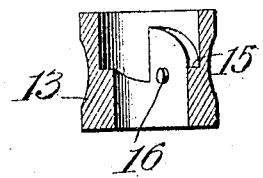
Figure 2:
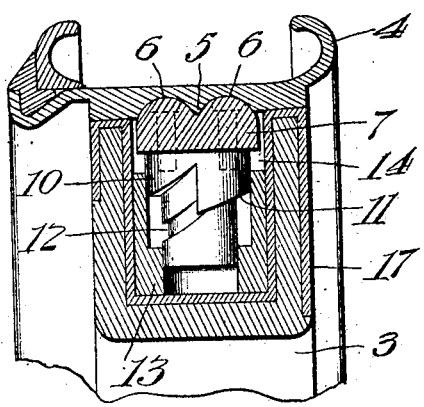

In the annexed drawings illustrating the preferred embodiment of the invention, Figure 1 is a side elevation of a wheel equipped with my improvements. Fig. 2 is a transverse section through the felly and rim showing the rim in position upon the felly and showing the locking or holding devices in engagement with the rim the parts being at the extreme limit of their movement. Fig. 3 is a longitudinal section through so much of the felly and rim as is necessary to illustrate my invention. Fig. 4 is a transverse section of the felly and rim showing the parts arranged to permit removal of the rim from the wheel. Fig. 5 is a longitudinal section on the line 5—5 of Fig. 3. Fig. 6 is a detail transverse section of the worm wheel which acts directly upon the rim engaging shoe to project or retract the same.
The hub 1 and the spokes 2 may be of the usual or any preferred or convenient construction, and constitute no part of my invention. The felly 3 is secured upon the outer ends of the spokes in the ordinary manner and the rim 4 may be of any desired size or shape corresponding to the tire to be carried thereby. On the inner concave face of the rim, I provide a longitudinal rib 5 which is shown in the present instance as being beveled on both sides and located between longitudinal grooves 6, the surface of the rim being thereby given a corrugated formation. At intervals around the felly, in the present instance at three equidistant points, I provide a rim-engaging shoe 7 which is seated within a recess 8 formed within the felly, and has its outer convex face provided with a central longitudinal groove 9 adapted to engage and fit smoothly and evenly against the rib 5 on the rim. The surface of the shoe at the sides of the groove is formed into convex ribs corresponding to the grooves 6 of the rim, so that the shoe and rim are constructed with interlocking surfaces, whereby when the shoe is in engagement with the rim, the rim will be firmly held upon the wheel. On the inner concave side of the shoe 7 is a pin 10 which extends into a chamber or socket formed in the felly and in the base of the recess 8, the said pin being constructed with two inclined or cam surfaces 11 and also having an inclined or cam groove 12 below the said cam surfaces. It will also be noted that the diameter of the pin or stud 10 is reduced below the cam surfaces 11, so that the worm wheel or driving gear 13 surrounding the pin may properly engage the same. This worm wheel 13 is fitted around the pin or stud 10 within the socket or chamber 14 of the felly, and is also provided with two internal cam surfaces or inclined shoulders 15 adapted to engage the cam faces 11 of the pin or stud, so that when the worm wheel is rotated in the proper direction, the pin or stud will be forced upward and the shoe 7 projected into engagement with the rim 4. Below the cam shoulders 15 a small projection or teat 16 is provided in the bore of the wheel to engage the groove 12, so that the said pin or stud may be positively drawn inward when the proper motion is imparted to the worm wheel.

A band or sheath 17 may be shrunk upon the felly and formed with spaced pockets to line the recesses 8 and the chambers 14, which band may also be extended over the sides of the felly, as shown. At one side of the socket 14 is a worm shaft 18 which meshes with the worm wheel 13, so that rotary motion may be imparted to the said worm wheel and the rim engaging shoe consequently projected or retracted, as may be desired.

By referring more particularly to Figs. 4 and 5, it will be noticed that one end of the worm shaft 18 fits closely within the bearing or bore 19 provided therefor in the felly, while the opposite end thereof is out of contact with the wall of the bore, as one end of the bore is enlarged to accommodate the threaded portion 20 of the shaft when the same is being inserted or withdrawn. A bushing or collar 21 is fitted around the shaft within the enlarged end of the bore, and this bushing or collar is held firmly in place by a set screw 22 inserted through the felly from the inner side thereof to engage the said bushing. The projecting end 23 of the worm shaft is flattened or may be angular to be engaged by a wrench or similar tool, so that the shaft may be rotated to impart motion to the worm wheel 13, and consequently operate the shoe, as will be readily understood.

From the foregoing description, taken in connection with the accompanying drawings, it is thought the use and advantages of my device will be readily understood and appreciated. Assuming the rim to be in place upon the wheel, it will be noted that the rim engaging shoe will be projected as shown in Fig. 2, so that the opposed faces of the shoe and the rim are in interlocking engagement. Should the tire be punctured and it be desired to remove the rim for that reason or for any other cause, the worm shaft 18 is rotated in the proper direction to cause the worm wheel 13, through the engagement of the pin 16 and the groove 12, to withdraw the shoe 7 from its engagement with the rim. If two of the shoes be thus disengaged from the rim, ordinarily the rim may then be slipped laterally from the wheel, but if through corrosion or any other cause the rim should not easily yield to the force applied thereto by the hands, the third shoe may be projected to a slight additional extent and the force thus applied to the rim will suffice to instantly loosen the same. In applying a new rim or a repaired rim and tire, the rim is engaged manually with one of the shoes, and is then pushed over the wheel so as to partly encircle the same, as far as may be easily done by hand. This position is illustrated in Fig. 4, in which the rim is at a slight angle to the felly, and in such a position that if the worm wheel 13 be rotated to cause its inclined shoulders to ride upon the inclined shoulders 11 of the pin or stud 10, said pin or stud will be caused to move outwardly with respect to the felly and the shoe will consequently be forced against and into engagement with the corrugated surface of the rim. This movement of the shoe will bring the inclined walls of the groove 9 against the tapered surfaces of the rib 5 and consequently will cause the said rib to ride toward the base of the groove, whereby the rim will be forced laterally over the felly, so as to assume its proper working position on the wheel. The engagement of the corrugated surfaces of the shoe and the rim will serve to interlock the shoe and the rim, so that lateral movement of the rim will be prevented, and it will be held firmly in place on the wheel.

It will be observed upon reference to Figs. 2 and 4 that the rim is supported by the felly and consequently the strain will be borne by the felly and not by the rim-engaging shoes entirely. It will be understood of course, that the corrugated surface of the rim extends throughout the same, but that the surface of the felly is not corrugated and consequently the full strength of the felly is available for supporting the wheel, the tire, and the weight placed on the wheel through the vehicle.

By extending the corrugated surface of the rim throughout the same, I avoid the necessity of bringing the rim into a particular position relative to the felly before attempting to move the shoes into engagement with the rim. Furthermore, the outer periphery of the felly is slightly inclined transversely to the felly so that the rim is seated against an inclined surface and, consequently when the shoe is moved outwardly into engagement with the rim, the rim will be forced up this surface so as to be wedged firmly upon the wheel. It will be readily seen that it is not necessary to detach any nuts or bolts in mounting my rim or demounting the same, and that all the operating parts are housed within the felly, so that the liability of loss or injury to the parts is avoided and time is saved in applying or removing the rim, it being necessary merely to apply a wrench to the worm shaft to rotate the same, as will be readily understood from the foregoing description and the drawings.

The device is very simple in construction and arrangement, being free of complicated mechanism, and will not add perceptibly to the weight of the wheel. Should it be necessary for any reason to remove the parts of the rim holding mechanism, the set screw 22 is withdrawn and the worm shaft 18, being then rotated, will ride outwardly through its bore until it is free of the worm wheel 13, when it may be easily withdrawn. The shoe with its inwardly projecting stud or pin and the worm wheel engaging the same may then be lifted bodily out of the recessed and socketed portion of the felly.

It will be readily seen that the several locking mechanisms are independent so that an injury to one does not affect the others. Should one locking device be rendered inoperative from any cause, the rim will be held by the remaining locking devices and will not slip from the wheel. It will also be observed that the transversely inclined engaging faces of the rim and wheel produce a wedging action of these parts and thereby compensate for wear.

When the rim is new, the greatest diameter of its inner periphery will be less than the greatest diameter of the wheel. Consequently, with the parts in the position shown in Fig. 4, a slight radial outward movement of the shoe will cause the rim to bind securely upon the wheel. As the contacting faces wear, the shoe may be projected to a greater degree and the rim thereby driven farther on the wheel until the limit of movement has been reached as shown in Fig. 2. Further wear then will necessitate the replacing of the parts.

The rim and shoe need not be of the particular corrugated shape shown but may be of any form which will effect an interlocking engagement. By avoiding the necessity of bringing the rim into a particular relation to the felly, I avoid the excessive wear on the valve which is the source of serious trouble.

In the foregoing description and the accompanying drawings, I have disclosed what I believe to be the best manner of applying my invention, but it is to be understood that minor changes may be made therein without departing from the scope of the invention, as set forth in the following claims.

Having thus described my invention, I claim as new and desire to secure by Letters Patent:

1. The combination of a felly, a rim encircling the felly and having a transversely tapered rib on its inner circumference, a locking member seated in the felly and provided with a convex outer surface having a longitudinal groove with converging walls adapted to engage said rib, and means seated in the felly adjacent said locking member to move the same radially of the felly into and out of engagement with the rim.

2. The combination of a felly having a transversely inclined outer periphery, a rim adapted to encircle the felly and correspondingly inclined, the inner periphery of said rim being provided with a transversely tapered longitudinal rib, and a grooved locking device mounted in the felly and movable radially of the same to engage said longitudinal rib on the rim and draw the rim onto the felly.

3. The combination of a wheel having a transversely inclined outer periphery, a rim adapted to encircle the wheel and rest upon said periphery, and a locking member mounted in the felly and movable radially thereof to directly engage the rim, the said locking member and the rim having opposed angularly arranged engaging faces whereby the rim will be drawn laterally onto the felly, and said rim being imperforate above said engaging faces.

4. The combination of a wheel having a transversely inclined outer periphery, a rim adapted to encircle the wheel and rest upon said periphery, and a locking member mounted in the felly and movable radially thereof to directly engage the rim, the said locking member and the rim having opposed angularly arranged engaging surfaces on opposite sides of the center of said locking member whereby the rim will be drawn laterally onto the felly.

5. The combination of a felly, a rim, a shoe mounted in the felly and adapted to engage the rim, a pin projecting inwardly from the shoe into the felly, a cam member seated in the felly and having a cam engagement with said pin to project and withdraw the shoe, and means also housed within the felly for operating said cam member.

6. The combination of a felly, a rim, a shoe mounted in the felly and adapted to engage the rim, a pin projecting from the shoe into the felly and having oppositely disposed cam shoulders thereon, a cam member seated in the felly and engaging said cam shoulders, and means for operating said cam member.

7. The combination of a felly, a rim, a shoe mounted in the felly and adapted to engage the rim, a pin projecting inwardly from the shoe into the felly and provided with oppositely disposed cam shoulders, and a cam groove below said shoulders, an operating member having inclined shoulders engaging the cam shoulders on the pin and an inwardly extending projection engaging said inclined groove, and means for rotating said operating member.

8. The combination of a felly, a rim, a shoe mounted in the felly and adapted to engage the rim, a pin projecting inwardly from the shoe into the felly and provided with oppositely disposed cam shoulders and a cam groove below said shoulders, a worm wheel having inclined shoulders engaging the cam shoulders on the pin and an inwardly extending projection engaging said cam groove, a worm shaft mounted transversely in the felly and meshing with said worm wheel.

9. The combination of a felly, a rim, a shoe mounted in the felly and adapted to engage the rim, a pin projecting inwardly from the shoe into the felly and provided with oppositely disposed cam shoulders and a cam groove below said shoulders, a worm wheel having inclined shoulders engaging the cam shoulders on the pin and an inwardly extending projection engaging said cam groove, a worm shaft mounted transversely in the felly and meshing with said worm wheel, a bushing around one end of said worm shaft, and a set screw mounted in the felly and engaging said bushing.

10. The combination of a felly, a rim, a shoe mounted on the felly and adapted to engage the rim, a pin projecting inwardly from the shoe and having a cam shoulder, an operating member having a cam shoulder engaging the one on the pin, means for rotating said operating member for projecting said shoe, and means for automatically retracting said shoe when said operating member is rotated in the reverse direction.

11. The combination with a wheel having its periphery inclined transversely, a rim adapted to encircle the wheel, a shoe on the wheel adapted to move radially thereof to engage the rim and move the same to a snugly binding position on the inclined periphery of the wheel, said shoe having a pin projecting inwardly therefrom, a cam shoulder and a cam groove, and a worm wheel and shaft coöperating with the shoulder and groove of the shoe to effect the radial movement of the shoe.

12. The combination of a felly, a rim, a shoe mounted in the felly and adapted to engage the rim, a pin projecting from the shoe and provided with oppositely disposed cam shoulders, a worm wheel having inclined shoulders engaging the cam shoulders on the pin, and a worm shaft mounted transversely in the felly and meshing with said worm wheel.

In testimony whereof I affix my signature, in presence of two witnesses.

HENRY B. KEIPER.

Witnesses:
 CHAS. E. LONG,
 C. H. FROST.